United States Patent

Arai et al.

[11] Patent Number: 5,947,649
[45] Date of Patent: Sep. 7, 1999

[54] REUSABLE TYPE END MILL

[75] Inventors: Tatsuo Arai; Takayoshi Saito; Norio Aso, all of Ibaragi-ken, Japan

[73] Assignee: Mitsubishi Materials Corporation, Tokyo, Japan

[21] Appl. No.: 08/922,551

[22] Filed: Sep. 3, 1997

Related U.S. Application Data

[63] Continuation of application No. 08/555,745, Nov. 9, 1995, abandoned.

[30] Foreign Application Priority Data

Nov. 11, 1994 [JP] Japan .................................. 6-278130

[51] Int. Cl.$^6$ ........................................................ B23C 5/20
[52] U.S. Cl. .............................. 407/34; 407/35; 407/55; 407/59
[58] Field of Search ............................... 407/34, 35, 40, 407/41, 43, 46, 47, 48, 49, 51, 53, 56, 59, 62, 63

[56] References Cited

U.S. PATENT DOCUMENTS

| | | | |
|---|---|---|---|
| 4,182,587 | 1/1980 | Striegl | 407/55 X |
| 4,586,855 | 5/1986 | Rawle | 407/55 |
| 4,714,383 | 12/1987 | Shimomura et al. | 407/42 |
| 4,790,693 | 12/1988 | Koblesky | 407/35 |
| 4,808,045 | 2/1989 | Tsujimura et al. | 407/42 X |
| 4,934,878 | 6/1990 | Plutschuck et al. | 407/42 |
| 5,083,887 | 1/1992 | Dotany | 407/59 |

FOREIGN PATENT DOCUMENTS

| | | |
|---|---|---|
| 0312970 | 4/1989 | European Pat. Off. . |
| 3314049 | 10/1984 | Germany . |
| 3727968 | 2/1988 | Germany . |

*Primary Examiner*—Andrea L. Pitts
*Assistant Examiner*—Henry W. H. Tsai
*Attorney, Agent, or Firm*—Armstrong, Westerman, Hattori, McLeland & Naughton

[57] ABSTRACT

First and second tips 4A and 4B are disposed on the outer periphery of the forward end of an end mill body 1 in a manner such that the tips 4A and 4B are displaced from each other about the periphery of the end mill body 1. The rotation loci of edges of the first and second tips 4A and 4B around the axis O of the end mill body 1 are mutually overlapped. The edge of the first tip 4A protrudes slightly farther toward the forward end of the end mill than the edge of the second tip 4B. Further, third tips 4C are disposed adjacent to the base end of the second tip 4B in such a manner that no gap is formed between the rotation locus of the edge of the third tip 4C located most adjacent to the forward end of the end mill body and the rotation locus of the rear end of the second tip 4B. As a consequence, the second tip 4B and the third tips 4C can be spirally disposed in the rearward rotating direction of the end mill as they extend toward the base end of the end mill. The respective tips 4, moreover, are formed of only one type having the same shape and dimensions. With this construction, the maintenance of tips can be remarkably simplified, and the wear of the tips, in particular, the wear of the first tip 4A, can be inhibited, thereby accomplishing a uniformity of the degree of the wear of the overall tips.

7 Claims, 6 Drawing Sheets

REUSABLE TYPE END MILL

This application is a continuation of application Ser. No. 08/555,745 filed Nov. 9, 1995, now abandoned.

BACKGROUND OF THE INVENTION

The present invention relates to a reusable type end mill used for performing a grooving or fluting operation on various types of workpieces.

A prior art reusable end mill of the concerned type is disclosed by way of example in Japanese Utility Model Publication No. 6-7855. The end mill disclosed in this publication is constructed as follows. A plurality of tip mounting seats are spirally arranged on the outer periphery of a generally cylindrical end mill body. Quadrilateral tabular replaceable tips (hereinafter referred to as "the tips") whose each surface forming the quadrilateral shape is used as an outer peripheral relief face, are detachably mounted on the respective tip mounting seats in such a manner that the tips are directed toward the outer periphery of the end mill. Edges formed on the tips constitute the outer peripheral edges of the end mill and are arranged such that no gap is formed between the rotation loci of the edges formed on the tips around the axis of the end mill body.

On the other hand, a quadrilateral tabular tip is known which is formed in a shape different from the tips having the above-described outer peripheral edges. Such tip is attached to the outer periphery of the forward end of the end mill body in such a manner that the face of the tip forming the quadrilateral shape is directed toward the forward end of the end mill. One of the edges formed on side ridges of the face forming the quadrilateral shape is used as an end cutting edge of the end mill. A forward-end and outer-peripheral edge is further provided on the tip, as well as the end cutting edge, in such a way that the forward-end and outer-peripheral edge extends from the end cutting edge and is directed toward the outer periphery of the forward end of the end mill body. No gap is formed between the rotation locus of the outer peripheral edges around the rotation axis O and the rotation locus of the rear end of the forward-end and outer-peripheral edge so that the forward-end and outer-peripheral edge can constitute the forward end portion of the outer peripheral edges.

However, the reusable type end mill constructed as described above presents the following problems. The tip forming the end cutting edge differs in shape from the tips forming the outer peripheral edges, which inevitably makes the maintenance of tips in an end mill body complicated and troublesome. In particular, the tip attached to the forward end of the mill body constitutes not only the end cutting edge, but also the forward-end and outer-peripheral edge which singly forms the forward end portion of the outer peripheral edges. Accordingly, this type of tip becomes worn very quickly. In addition to this disadvantage, since this tip is formed in a shape different from the other tips constituting the outer peripheral edges, the two types of tips are not interchangeable. This requires that an extra tip of the former type be kept in hand in advance in order to speedily accommodate the aforementioned rapid wear, with the result that the maintenance of tips becomes more complicated and troublesome.

SUMMARY OF THE INVENTION

Accordingly, in view of the above-described background, an object of the present invention is to provide a reusable type end mill in which the maintenance of tips can be simplified, and the wear of the forward-end and outer-peripheral edge of the tip which forms the end cutting edge can be reduced, thereby achieving the longer life of the tip.

In order to achieve the above object, the present invention provides a reusable type end mill comprising a generally cylindrical end mill body having a plurality of tip mounting seats formed on the outer periphery of the end mill body, and a plurality of quadrilateral tabular replaceable tips of substantially the same shape and dimensions detachably mounted on the respective mounting seats in such a manner that a face forming the quadrilateral shape in each tip serves as a rake surface, and is directed in the rotating direction of the end mill and that a cutting edge formed on a side ridge of the rake surface is positioned adjacent to the outer periphery of the end mill, wherein the replaceable type tips include at least a pair of tips containing a first tip and a second tip disposed at the forward end of the end mill body, and at least one third replaceable type tip disposed adjacent to the base end of the second tip, the first and second tips being displaced from each other in the peripheral direction of the end mill body, wherein the rotation loci of the edges of the first and second tips around the axis of the end mill body are overlapped by each other, and the edge of the first tip is disposed to protrude toward the forward end of the end mill further than the edge of the second tip, the third tip being arranged in such a manner that no gap is formed between the rotation locus of the edge of the third tip and the rotation locus of the rear end of the edge of the second tip so that the second and third tips are spirally arranged toward the rear of the end mill proceeding toward the base end thereof.

In the reusable type end mill constructed as described above, the first tip constituting the end cutting edge has the same shape and dimensions as the second and third tips constituting the outer peripheral edges. That is, since all the tips attached to the end mill body are identically formed, the maintenance of the tips can be remarkably simplified. Additionally, the edge of the first tip serving as the forward-end and outer-peripheral edge is located in relation to the edge of the second tip in such a manner that the rotation loci of the edges of the first and second tips around the axis can overlap each other. With this arrangement, a load acting upon the edge of the first tip can be decreased, thereby inhibiting the wear of the first tip.

For a better understanding of the invention, its operating advantages and the specific objectives obtained by its use, reference should be made to the accompanying drawings and description which relate to preferred embodiments thereof.

DESCRIPTION OF PREFERRED EMBODIMENTS OF THE INVENTION

Figure 1:
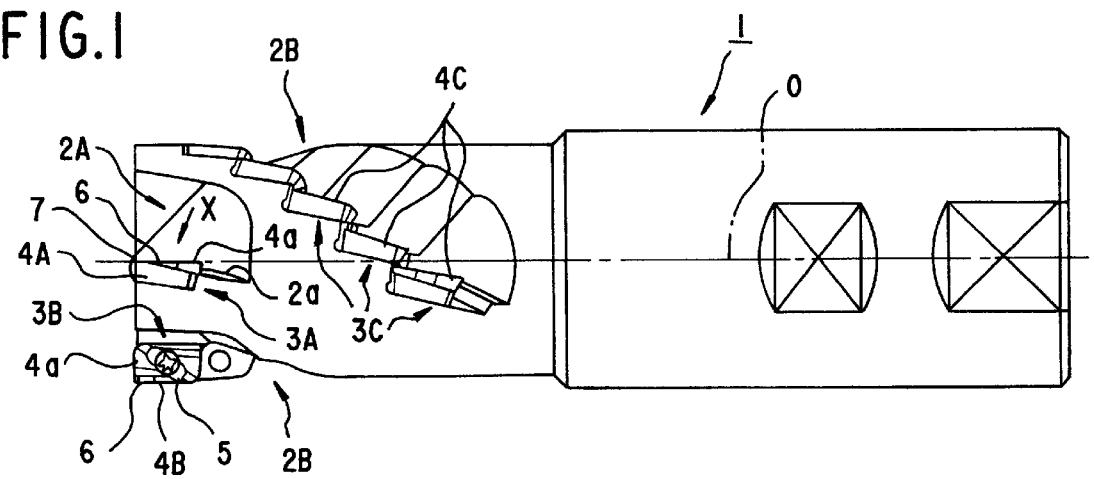
FIG. 1 is a side view illustrating one embodiment of the present invention.
Figure 2:
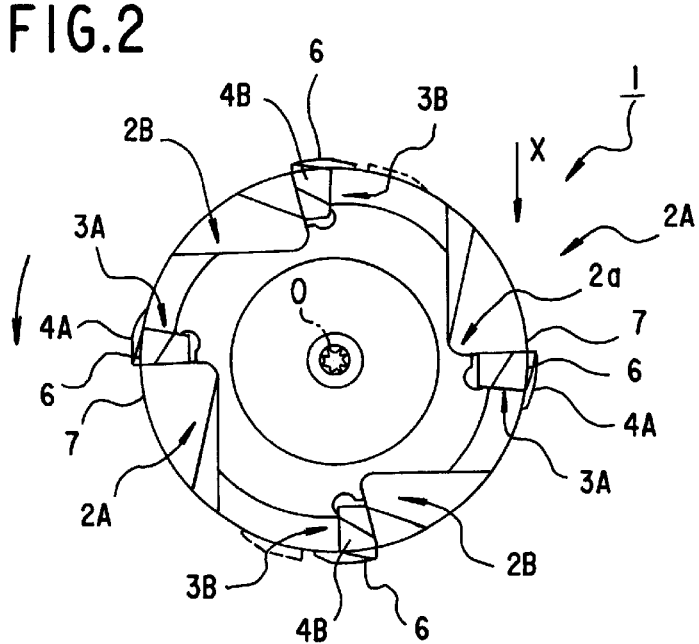
FIG. 2 is a front view of the embodiment shown in FIG. 1, as viewed from the forward end thereof.
Figure 3:
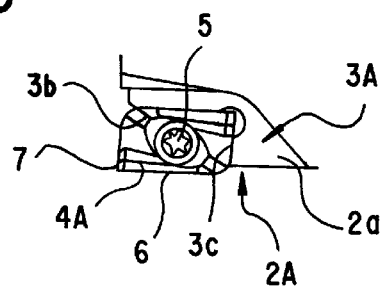
FIG. 3 is a plan view of the embodiment shown in FIG. 1, as viewed from the arrow X of FIG. 1.

An embodiment of the present invention will now be described with reference to FIGS. 1–4.

In this embodiment, a generally cylindrical end mill body, generally denoted by 1, is formed of a steel material, or the like. Four chip pockets 2 are formed at equal intervals circumferentially on the outer periphery of the forward end of the end mill body 1. Among these chip pockets 2, one pair of chip pockets, indicated as 2A, 2A in the drawings, are oppositely disposed with respect to the rotation axis O of the end mill body 1 and are disposed only at the forward end of the periphery of the end mill body 1. On the other hand, another pair of chip pockets 2B, 2B are spirally arranged, extending in a helical manner in the rearward rotating direction (indicated by the arrow in the figures) of the end mill around the rotation axis O as they proceed from the forward end to the base end on the outer periphery of the body 1.

First tip mounting seats 3A, 3A are respectively formed on the walls 2a of the pair of chip pockets 2A, 2A facing in the rotating direction of the end mill. On the other hand, second tip mounting seats 3B, 3B are respectively formed at the extreme forward ends of the wall surfaces of the chip pockets 2B, 2B facing in the rotating direction of the end mill. Additionally, five third tip mounting seats 3C are formed farther toward the base end of the end mill than the second tip mounting seats 3B. First, second and third tips 4A, 4B and 4C are detachably fixed to the first, second and third tip mounting seats 3A, 3B and 3C, respectively, by means of clamp screws 5. Accordingly, in this embodiment, two pairs of tips, each pair having first and second tips 4A and 4B, are provided for one end mill body 1.

In this embodiment, all the first, second and third tips 4A, 4B and 4C are each formed of a hard material, such as a cemented carbide, or the like, in the shape of a tabular parallelogram of the substantially identical shape and dimensions. The tips 4 are of the type of positive tips constructed as described below. Major cutting edges 6, 6 are formed on the long side ridges of one face 4a forming the parallelogram, while lateral faces formed between the respective major cutting edges 6, 6 and the other face of the parallelogram each have an angle of relief. Further, minor cutting edges 7, 7 are formed on the short side ridges of the face 4a in such a manner that they extend beyond the major cutting edges 6, 6, respectively. One of the minor cutting edges 7, 7 of the first tip 4A is thereby used as an end cutting edge of the end mill.

Among the tip mounting seats 3A, 3B and 3C having the aforementioned tips 4A, 4B and 4C mounted thereon, the first tip mounting seat 3A is defined by a bottom surface 3a facing in the rotating direction of the end mill, a wall surface 3b raised from the bottom surface 3a and facing toward the outer periphery of the end mill, and a wall surface 3c also raised from the bottom surface 3a and facing toward the forward end of the end mill. The first tip mounting seat 3A constructed, as described above, is formed as a recess behind the wall surface 2a of the chip pocket 2 in the rearward rotating direction of the end mill.

Figure 4:
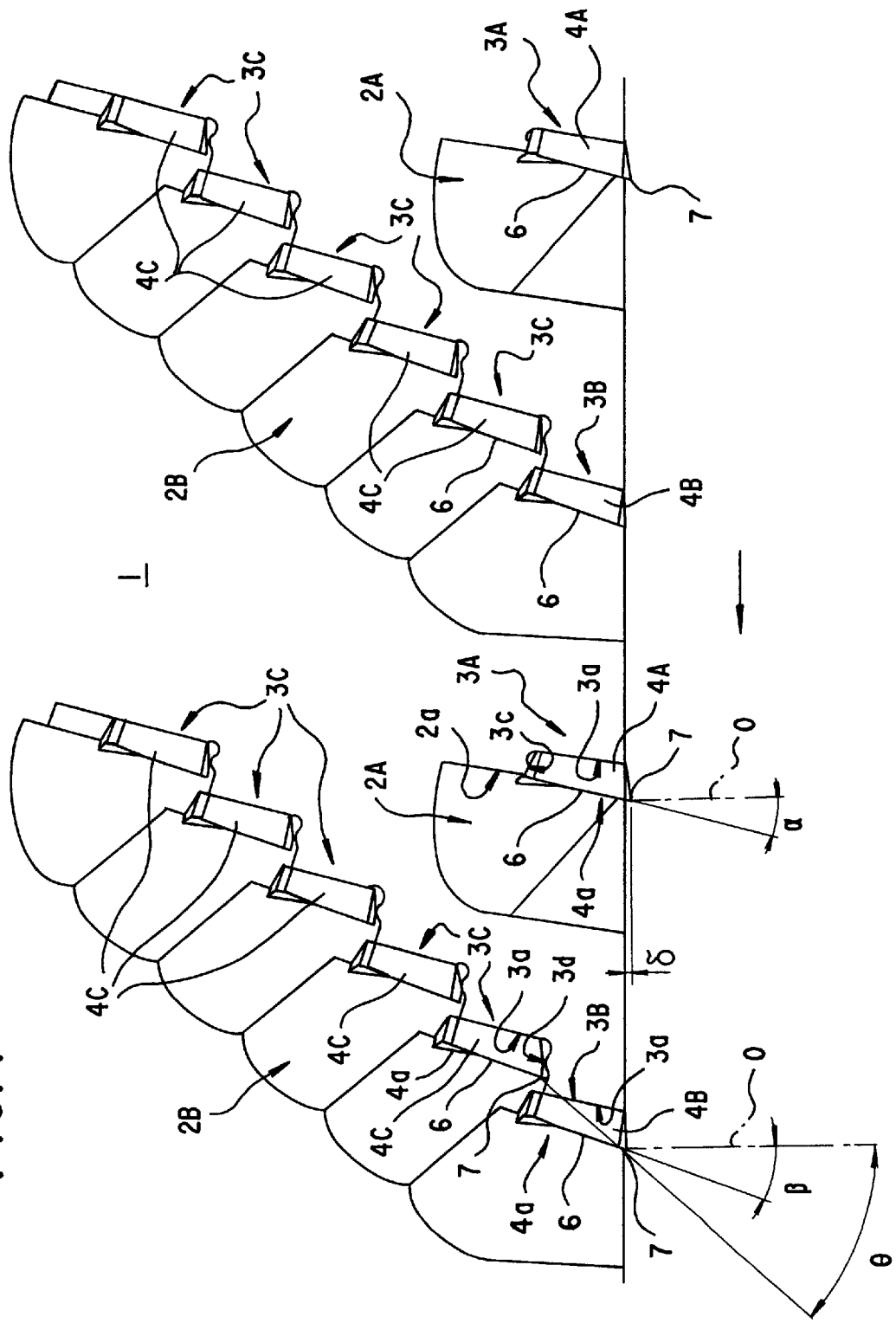
FIG. 4 is an exploded side view of the embodiment shown in FIG. 1.
Figure 5:
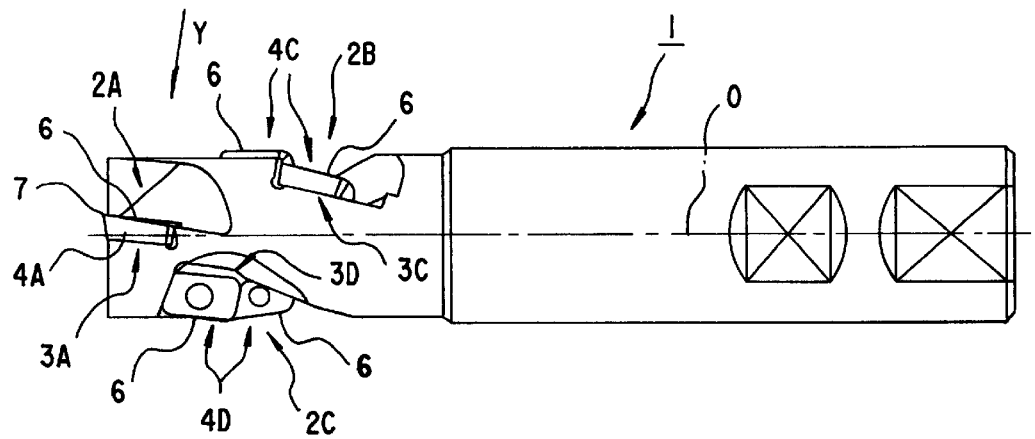
FIG. 5 is a side view illustrating another embodiment of the present invention.
Figure 6:
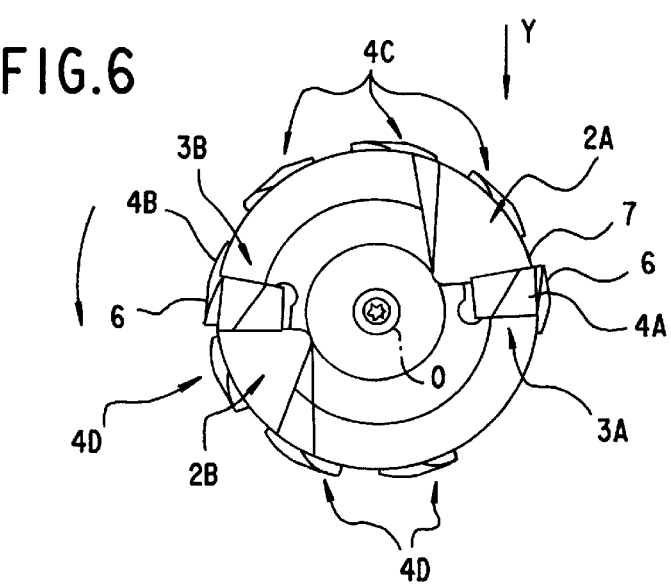
FIG. 6 is a front view of the embodiment shown in FIG. 5, as viewed from the forward end thereof.
Figure 7:
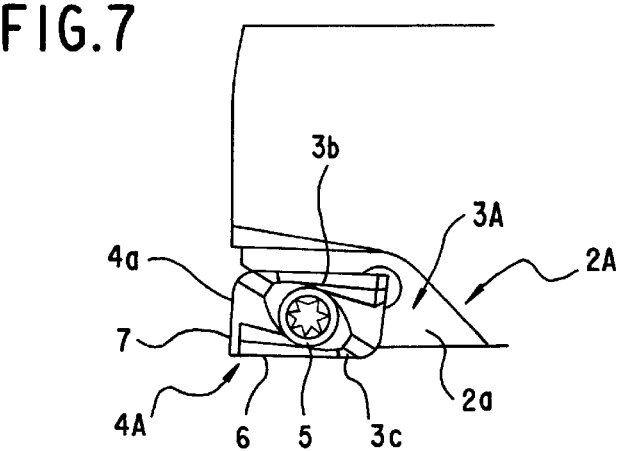
FIG. 7 is a plan view of the embodiment shown in FIG. 5, as viewed form the arrow Y of FIG. 5.
Figure 8:
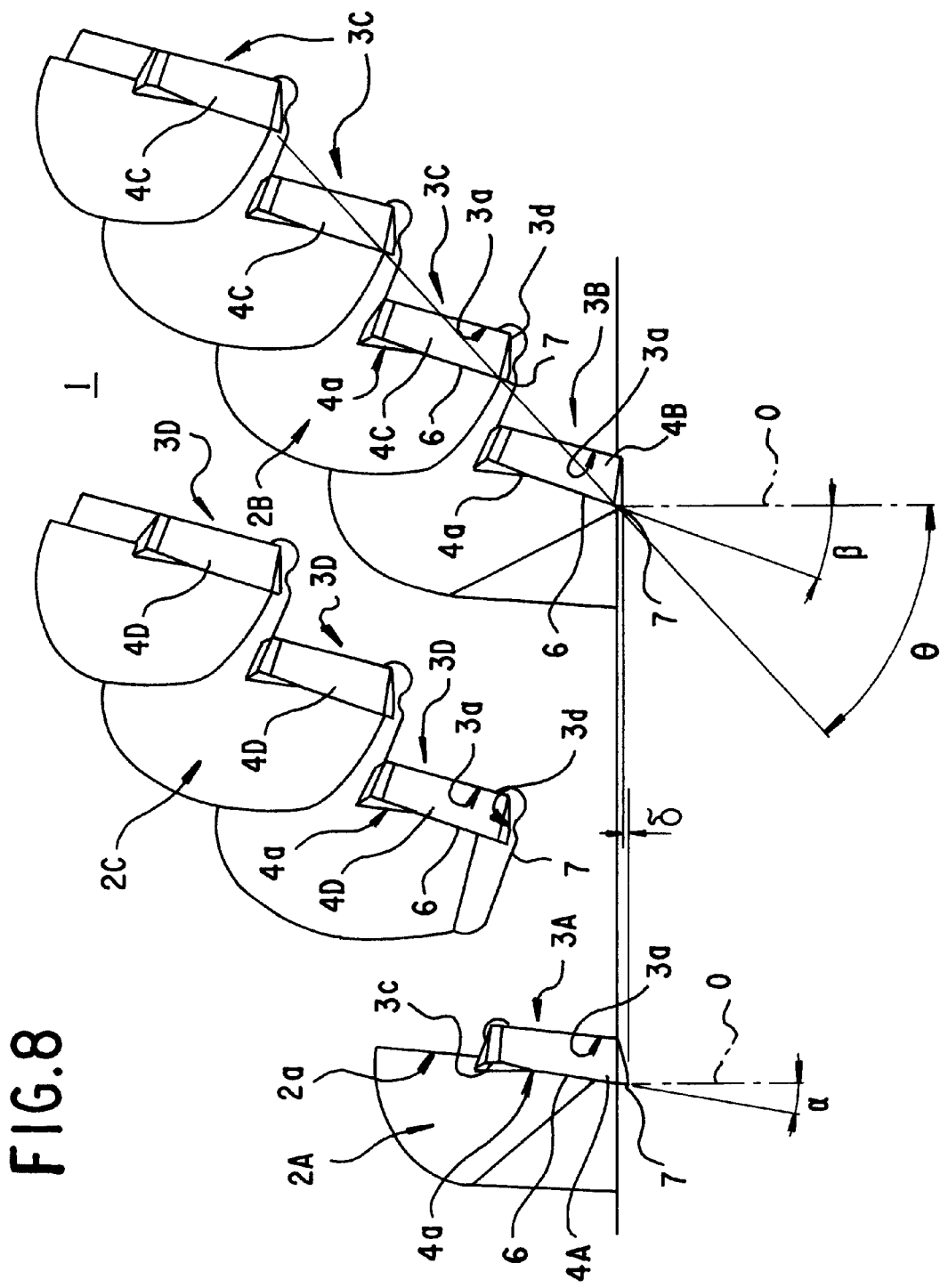
FIG. 8 is an exploded side view of the embodiment shown in FIG. 5.

The above-described first tip 4A is mounted on the first mounting seat 3A according in the following manner. The major face 4a forming a parallelogram and serving as a rake surface, is disposed facing the rotating direction of the end mill, while the other surface forming the parallelogram, serving as a seating face, is intimately seated on the bottom surface 3a. One of the major cutting edges 6 and the associated minor cutting edges 7 are positioned adjacent to the outer periphery and to the forward end of the end mill, respectively. The lateral faces continuing from the other major and minor cutting edges 6 and 7 are brought into contact with the wall surfaces 3b and 3c, respectively. With this construction, the major cutting edge 6 located toward the outer periphery of the end mill has a positive axial rake angle α, as shown in FIG. 4. The axial rake angle α provided for the cutting edge 6 of the first tip 4A is desirably set to be in a range of from 5° to 15°. In this embodiment, the axial rake angle α is set to be 14°.

Among the above-described tip mounting seats 3A, 3B and 3C, the second tip mounting seats 3B, 3B are each defined by a bottom surface 3a facing in the rotating direction of the end mill and a wall surface 3b facing toward the outer periphery of the end mill The third tip mounting seats 3C are each defined by a wall surface 3d facing toward the base end of the end mill in addition to the aforementioned bottom surface 3a and the wall surface 3b. This wall surface 3d is disposed to extend from the base end of the bottom surface 3a of the adjoining mounting seat 3B or 3C located farther toward the forward end of the end mill. Accordingly, the second tip mounting seats 3B and 3C are spirally disposed in the form of steps on the wall surface of the chip pocket 2B facing in the rotating direction of the end mill. The helix angle θ of the spiral formed by the second and third tip mounting seats 3B and 3C is desirably set to be in a range of from 40° to 56°. In this embodiment, the helix angle θ is set to be 43°.

The second tip 4B is mounted on the second tip mounting seat 3B in the following manner. The face 4a serving as the rake surface is disposed facing the rotating direction of the end mill, while the other surface, serving as the seating face, is brought into intimate contact with the bottom surface 3a. Further, one of the major cutting edges 6 is positioned on the outer periphery of the end mill, and the lateral face extending from the other cutting edge 6 is brought into intimate contact with the wall surface 3b. Moreover, the third tips 4C are mounted on the third mounting seats 3C respectively, in a manner similar to the second tip 4B. The rake surface 4a of the tip faces in the rotating direction of the end mill, while the other tip surface is brought into intimate contact with the bottom surface 3a. Further, one of the cutting edges 6 is positioned on the outer periphery of the end mill, while the lateral surface of the tip extending from the other edge 6 is brought into intimate contact with the wall surface 3b. Then, the lateral surface extending from the minor cutting edge 7 adjacent to the forward end of the end mill is brought into intimate contact with the wall surface 3d.

The cutting edge 6 of the second tip 43 located on the outer periphery of the end mill, as well as the cutting edge 6 of the first tip 4A, has a positive axial rake angle. In this embodiment, the second tip 4B has an axial rake angle β which is greater than the axial rake angle α of the first tip 4A. The axial rake angle β of the cutting edge 6 of the second tip 4B is desirably set to be in a range of from 10° to 30°. In this embodiment, the angle β is set to be 20°. The cutting edges 6 of the respective third tips 4C also have the same axial rake angle β equal to the angle provided for the cutting edge 6 of the second tip 4B.

Since the second and third tip mounting seats 3B and 3C are disposed in the form of steps in this embodiment, the axial rake angle β never becomes greater than the helical angle θ of the second and third tip mounting seats 3B and 3C.

The rear end of the cutting edge 6 of the second tip 4B is located in the same axial position as the rear end of the edge 6 of the first tip 4A along the axis O. Because of this arrangement, the rotation locus of the edge 6 of the first tip 4A is overlapped by the locus of the edge 6 of the second tip 4B.

In this embodiment, however, the axial rake angle β of the cutting edge 6 of the second tip 4B is set greater than the angle α of the edge 6 of the first tip 4A. With this arrangement, the forward end of the cutting edge 6 of the first tip 4A protrudes slightly farther toward the forward end of the end mill than the forward end of the edge 6 of the second tip 4B.

Thus, in this embodiment, the rear ends of the edges 6 of the first and second tips 4A and 4B are placed in the same axial position along the axis O, while the axial rake angles α and β of the respective edges 6 are set differently from each other. As a consequence, the cutting edge 6 of the first tip 4A protrudes slightly farther toward the forward end of the end mill than the edge 6 of the second tip 4B. This positional relationship between the edges 6 of the first and second tips 4A and 4B may be achieved by the following modification. That is, the axial rake angles α and β may be set equal to each other, while the rear end of the first tip 4A is displaced from that of the second tip 4B along the axis O.

The protrusion amount δ of the cutting edge 6 of the first tip 4A in relation to the edge 6 of the second tip 4B is desirably set to be in a range of from 0.1 mm to 3.0 mm. In this embodiment, the protrusion amount δ is set to be 0.4 mm.

The third tips 4C are each disposed such that the forward end of the cutting edge 6 thereof is positioned slightly farther toward the forward end of the end mill in the direction of the axis O than the rear end of the edge 6 of the adjoining second tip 4B or the adjoining third tip 4C toward the forward end of the end mill. With this construction, a train of cutting edges 6 is formed on the outer periphery of the end mill body 1 in such a way that no gap is formed between the rotation loci of the edges 6 around the axis O from the forward end adjacent to the edges 6, 6 of the first and second tips 4A and 4B to the base end of the end mill. The peripheral edges of the reusable type end mill of this embodiment are thus formed.

In the reusable type end mill constructed as described above, the first, second and third tips 4A, 4B and 4C are formed in the same shape and same dimensions and are thus interchangeable. Accordingly, when replacements of tips 4 are required due to abrasion, chipping, etc., it is essential only that one type of spare tips 4 be kept on hand, thereby coping with speedy replacements of any of the tips 4A, 4B and 4C. This makes it possible to greatly simplify the maintenance of the tips 4 in the end mill body 1, thereby reducing the labor required for the maintenance of tips and providing increased working efficiency.

There sometimes may be cases in which the third tip 4C adjacent to the base end of the end mill body 1 is not actually used for cutting, for example, in a case in which the depth of cut to be formed by the throw-away type end mill is small. In such a case, one of the tips 4A–4C, which have become worn or chipped, may be replaced with the third tip 4C which is not used for cutting. With this replacement, the wear of the tips 4 can be promptly handled without the necessity of having to keep spare tips 4 on hand, thereby further increasing working efficiency.

Moreover, only a pair of trains of the cutting edges 6 of the continuous five third tips 4C are disposed adjacent to the base end on the outer periphery of the end mill body 1. In contrast, two pairs of tips each pair having first and second tips 4A and 4B, that is, two pairs of the edges 6, 6, are disposed adjacent to the forward end on the outer periphery of the end mill body 1 in such a manner that the rotation locus of the edges 6 of the first tips 4A around the axis O is overlapped by the locus of the edges 6 of the second tips 4B. With this construction, it is possible to decrease a load acting upon the individual edges 6 of the first and second tips 4A and 4B during a cutting operation. This inhibits the frequencies of occurrences of wear and chipping, thereby achieving the longer life of the tips.

In particular, in the first tip 4A, whose minor cutting edge 7 extending from the major cutting edge 6, is used as the end cutting edge of the end mill, it is likely that the wear of the overall tip 4A will be hastened due to abrasion of the cutting edge 7. Under these conditions, if the load acting upon the cutting edge 6 of the first tip 4A during a cutting operation is equal to the load upon the edges 6 of the third tips 4C, which has been experienced by the foregoing conventional end mill, the first tip 4A becomes seriously worn out, which may result in the necessity of very frequent replacements of the first tips 4A. Further, the above conventional type of the end mill is employed for cutting by rotating the generally cylindrical end mill body 1 around the axis O after the base end of the end mill body 1 is attached to the spindle of a machine tool, such as a machining center, or the like. Consequently, it is very likely that a deflection will occur to the forward end of the end mill body 1 which is located farthest away from the spindle. This deflection may easily increase the cutting load acting upon the cutting edge 6 of the first tip 4A located at the extreme forward end of the body 1, thereby further accelerating the wear of the tip 4A.

In contrast to the conventional type of end mill, the reusable type end mill of this embodiment is constructed as described above. Namely, the rotation locus of the cutting edge 6 of the first tip 4A is overlapped by the locus of the edge 6 of the second tip 4B, thereby inhibiting the abrasion of the edge 6 of the first tip 4A. This makes it possible to ensure the uniformity of the degree of wear among the first, second and third tips 4A, 4B and 4C, thereby preventing very frequent replacements of the tips.

Due to the synergistic effect of the aforementioned advantage and the foregoing simplified maintenance for tips, the overall easy maintenance of tools is also enhanced, thereby further improving the working efficiency.

Further, the tip mounting seat 3A is separately disposed in a position in which it is circumferentially displaced from the second tip mounting seat 3B which forms steps with the third tip mounting seats 3C extending toward the base end. Because of this construction, the first tip mounting seat 3A can be defined by the bottom surface 3a facing in the rotating direction of the end mill, the wall surface 3b facing toward the outer periphery of the end mill, and the wall surface 3c facing toward the forward end of the end mill. The first tip 4A can be accurately and securely mounted on the mounting seat 3A along the axis O by bringing the lateral face of the first tip 4A into contact with the wall surface 3c. Along with this secure fixation of the first tip 4A, the minor cutting edge 7 of the first tip 4A protruding to the forward end of the end mill, so as to be used as the end cutting edge, can be accurately located along the axis O. Accordingly, by use of the throw-away type end mill constructed as described above, the bottom face of a workpiece can be finished with high precision in a grooving or fluting operation.

On the other hand, since the second tip mounting seat 3B is defined by only the bottom surface 3a and the wall surface 3b facing toward the outer periphery of the end mill, the second tip 4B is not so securely located along the axis O as the first tip 4A. However, since the minor cutting edge 7 of the second tip 4B is located in a more receding position toward the base end than the edge 7 of the first tip 4A, it is not involved in the actual cutting operation. As a consequence, even if the second tip 4B is mounted on the mounting seat 3B along the rotation axis O with a small amount of error, the precision of the machined bottom face of a workpiece cannot be impaired.

On the contrary, in this embodiment, the second tip mounting seat 3B and the third tip mounting seats 3C are not each provided with the wall surface 3c facing toward the forward end of the end mill but, instead, provided with the bottom surfaces 3a and the wall surfaces 3d which are spirally disposed in the form of steps in the rearward rotating direction of the end mill. The base end of the above-described face 4a forming the parallelogram, which is used as the rake surface of each of the tips 4B and 4C mounted on the respective mounting seats 3B and 3C, can thus be freed into the chip pocket 2B. According to this embodiment, constructed as described above, a large volume of comparatively-broad chips produced by the cutting edges 6 of the second and third tips 4B and 4C can be speedily discharged into the chip pockets 2 from the respective rake surfaces, and can be smoothly exhausted to the exterior.

Also, in this embodiment, all the tips 4 attached to the end mill body 1 each have a positive axial rake angle. In particular, in the first and second tips 4A and 4B attached to the forward end of the end mill body 1, the axial rake angle β of the cutting edge 6 of the second tip 4B is set greater than the axial rake angle α of the edge 6 of the first tip 4A. With this arrangement, the tips 4 of the same shape and same dimensions whose cutting edges 6 also have the same length are used as the first and second tips 4A and 4B. Moreover, on one hand, the rear ends of the cutting edges 6 of the first and second tips 4A and 4B are located in the same axial position along the axis O. On the other hand, the forward end of the cutting edge 6 of the first tip 4A protrudes slightly farther toward the forward end of the end mill than that of the edge 6 of the second tip 4B. With this construction, the associated minor cutting edge 7 can be used as an end cutting edge.

The rear ends of the edges 6 of the first and second tips 4A and 4B are located in the same axial positions along the axis O, as described above, which would otherwise cause the generation of steps on a work surface during a grooving or fluting operation. By virtue of this advantage, the work wall surface can be machined with high precision. Additionally, the bottom work surface can also be machined with high precision by use of only the minor cutting edge 7 of the first tip 4A as the end cutting edge. Given the aforementioned advantages, according to this embodiment, it is thus possible to form the overall machined surface with high precision in a grooving or a fluting operation.

In this embodiment, the protrusion amount δ of the cutting edge 6 of the first tip 4A in relation to the edge 6 of the second tip 4B, that is, the protrusion amount of the minor cutting edge 7 of the first tip 4A provided for a cutting operation in relation to the edge 7 of the second tip 4B which is not used for cutting, is set to be 0.4 mm. If this protrusion amount δ is excessively great, the amount of overlapping of the edges 6 of the first and second tips 4A and 4B becomes relatively small. This may increase the degree of the wear of the first tip 4A, in particular, the forward end thereof, which may further lead to inconsistencies in the degree of the wear among the tips. On the other hand, if the protrusion amount δ is excessively small, the minor cutting edge 7 of the second tip 4B may interfere with the bottom work surface which should be singly cut by the edge 7 of the first tip 4A, which may cause an impairment of the precision of the machined bottom surface of a workpiece.

Because of the reasons given above, the protrusion amount δ is desirably set to be in a range of from 0.1 mm to 3.0 mm as indicated above.

Also, in this embodiment, the axial rake angle α of the major cutting edge 6 of the first tip 4A is set to be 14°, while the axial rake angle β of the edge 6 of the second tip 4B is set to be 20°. The latter angle β is set greater than the former angle α so that the above-described protrusion amount δ can be obtained. If this axial rake angle α is too great, an amount of relief between the bottom work surface and the lateral face of the first tip 4A facing toward the forward end of the end mill, that is, the lateral face serving as a relief surface provided with the minor cutting edge 7 used as the end cutting edge may become insufficient.

Moreover, in this embodiment, the greater the axial rake angle α of the cutting edge 6 of the first tip 4A, the greater the axial rake angle β of the second and third tips 4B and 4C, accordingly. In other words, the axial rake angles of the edges 6 of all the tips 4 attached to the end mill body 1 become greater, which shortens the overall length of the edges 6 along the axis O. This requires a larger number of tips 4 to be attached to the end mill body 1. Or, if the cutting edge 6 is linearly formed, the distance from the edge 6 to the axis O varies from the forward end to the rear end of the edge 6, which may further cause deformation of the work wall surface.

Conversely, the smaller the axial rake angle β, the smaller the axial rake angle α accordingly. An excessively small angle α brings about an increase in the cutting resistance acting upon the major cutting edge 6 and the minor cutting edge 7 of the first tip 4A, which is used as the end cutting edge, and may disadvantageously promote abrasion of the first tip 4A and increase the frequency of occurrence of chipping. This may result in inconsistencies in the degree of the wear among the tips 4.

In order to avoid the above-described possible problems, the axial rake angle α of the cutting edge 6 of the first tip 4A is desirably set to be in a range of from 5° to 15°, while the axial rake angle β of the edge 6 of the second tip 4B is desirably set to be in a range of from 10° to 30°.

Still further, the following type of tabular positive tips are used as the first, second and third tips 4A, 4B and 4C in this embodiment. As described above, the major cutting edges 6, 6 are formed on the long side ridges of one surface (rake surface) 4a forming the parallelogram, and lateral surfaces (relief surfaces) formed between the cutting edges 6, 6 and the other surface (seating surface) forming the parallelogram each have an angle of relief. The minor cutting edges 7, 7 are formed at the short side ridges of the rake surface 4a in such a manner that they extend from the major cutting edges 6, 6, respectively. More specifically, the tip disclosed in Japanese Patent Laid-Open No. 5-305914 is desirably used as the first, second and third tips 4A, 4B and 4C in this embodiment.

This tip, which has been invented by the present inventors, has a nose portion formed at a corner of a polygonal tabular tip body. A cutting edge is formed to extend from the nose portion and located on at least one of two intersecting ridges formed by a pair of adjacent lateral surfaces of the tip body across the nose portion and by one surface of the tip body extending from the nose portion. The aforementioned surface forms inclined surfaces tilting toward the other surface of the tip body as they extend farther away from the nose portion. In accordance with the inclined surfaces, the above-described two intersecting ridges also incline toward the other surface of the tip body as they extend farther away from the nose portion. The ridges formed by the respective inclined surfaces and the respective lateral surfaces constitute brakes. As discussed above, at least one cutting edge inclines toward the other surface of the tip body as the edge proceeds farther away from the nose portion. With this construction, the axial rake angle and the radial rake angle can be set greater regardless of the angle of the bottom surface of the tip mounting seat.

The aforementioned tip, constructed as described above, is employed as the aforementioned tips 4 for use in the throw-away type end mill. Accordingly, it is possible to ensure a sufficient thickness of the tip mounting seats 3 of the end mill body 1 in the rearward rotating direction of the end mill, while the cutting edges 6 of the first second and third tips 4A, 4B and 4C have the foregoing suitable axial rake angles $\alpha$ and $\beta$. This improves the rigidity of the end mill body 1 so as to prevent the occurrence of the deflection of the end mill body 1. With this advantage, according to this embodiment it is further possible to effectively reduce the wear of the tips, in particular, the wear of the first and second tips 4A and 4B located adjacent to the forward end of the end mill which are inevitably subjected to an increased load due to the possible deflection of the end mill body 1. The life of the tips can thus be further prolonged.

FIGS. 5–8 illustrate another embodiment of the present invention. The same elements as those described in the embodiment shown in FIGS. 1–4 are designated by like reference numerals.

In this embodiment, a pair of chip pockets 2A and 2B are formed at the forward end of the outer periphery of the end mill body 1 in such a manner that they are located substantially oppositely facing each other with respect to the rotation axis O. First and second tips 4A and 4B are mounted on tip mounting seats 3A and 3B formed at the forward ends of the chip pockets 2A and 2B, respectively.

More specifically, this embodiment is constructed as follows. A pair of first and second tips 4A and 4B are disposed at the forward end of the end mill body 1. The rotation locus of the cutting edges 6, 6 of the first tip 4A around the axis O is overlapped by the locus of the edges 6, 6 of the second tip 4B. Also, the edge 6 of the first tip 4A protrudes slightly farther toward the forward end of the end mill than the edge 6 of the second tip 4B. Further, three third tips 4C are disposed adjacent to the base end of the second tip 4B in such a manner that no gap is formed between the rotation locus of the edge 6 of the tip 4C located most adjacent to the forward end of the end mill body and the rotation locus of the rear end of the edge 6 of the second tip 4B. Because of this arrangement, the third tips 3C can be spirally formed in the rearward rotating direction of the end mill as they extend toward the base end of the end mill.

Further, chip pockets 2C are formed on the outer periphery of the end mill body 1 circumferentially located between the chip pockets 2A and 2B. A fourth set of three tip mounting seats 3D are each provided on the wall surface of the chip pocket 2C facing in the rotating direction of the end mill in such a way that they are spirally disposed in the form of steps toward the rearward rotating direction of the end mill as they extend toward the base end of the end mill. A fourth set of three tips 4D are mounted on the mounting seats 3D, respectively. Accordingly, the fourth tips 4D are displaced from the first, second and third tips 4A, 4B and 4C on the periphery of the end mill body 1.

The fourth tips 4D are each generally formed in the shape of a tabular parallelogram of the same shape and dimensions as the first, second and third tips 4A, 4B and 4C. The fourth tips 4D are also disposed in relation to the third tips 4C and the first tip 4A in the following manner. The rotation locus of the cutting edges 6 of the respective fourth tips 4D around the axis O is overlapped by the locus of the edges 6 of the respective third tips 4C. Also, no gap is formed between the rotation locus of the edge 6 of the fourth tip 4D most adjacent to the forward end of the end mill body and the locus of the rear end of the edge 6 of the first tip 4A. In this embodiment, the axial rake angle $\beta$ of the edge 6 of each of the fourth tips 4D is set to be equal to be the axial rake angle $\beta$ of the edges 6 of the second and third tips 4B and 4C.

The reusable type end mill of this embodiment is constructed in a manner similar to the end mill of the previous embodiment. That is, all the tips 4A–4D attached to the end mill body 1 are formed of the same shape and dimensions. Also, the rotation loci of the edges 6, 6 of the first and second tips 4A and 4B located at the forward end of the end mill body are mutually overlapped with each other. Moreover, the edge 6 of the first tip 4A protrudes slightly farther toward the forward end of the end mill than the edge 6 of the second tip 4B. Accordingly, advantages similar to those obtained in the previous embodiment can be realized.

In addition to the above-described construction, this embodiment is provided with the fourth tips 4D so that the rotation locus of the edges 6 of the fourth tips 4D can be overlapped by the locus of the edges 6 of the third tips 4C. With this arrangement, the cutting load acting upon the individual edges 6 of the third and fourth tips 4C and 4D can be decreased. This can inhibit the degree of the wear and the occurrence of chipping more reliably, thereby achieving a much longer life of the tips.

Additionally, in this embodiment, the first and second tips 4A and 4B are displaced from each other in the peripheral direction of the end mill body 1. Then the fourth tips 4D are further displaced from the first, second and third tips 4A, 4B and 4C about the periphery of the end mill body. With this arrangement, the peripheral distance between the edges 6, 6 of the first and second tips 4A and 4B differs from the peripheral distance between the edges 6, 6 of the third and fourth tips 4C and 4D. This differentiates the cycle in which a cutting load acts upon the forward end of the end mill body from the cycle in which a load acts upon the portion adjacent to the base end of the end mill during a cutting operation.

With this construction, a cutting load acting upon the first and second tips 4A and 4B and a load upon the third and fourth tips 4C and 4D offset each other. This prevents a cutting load at a fixed cycle from acting upon the overall end mill body 1 during a cutting operation, which would otherwise cause chattering in the end mill body 1 due to the cyclic load. As a consequence, the precision of the machined surface can further be improved, and the wear of the tips, in particular, the wear of the first and second tips and 4B located at the forward end of the end mill body, can be inhibited more reliably.

Figure 9:
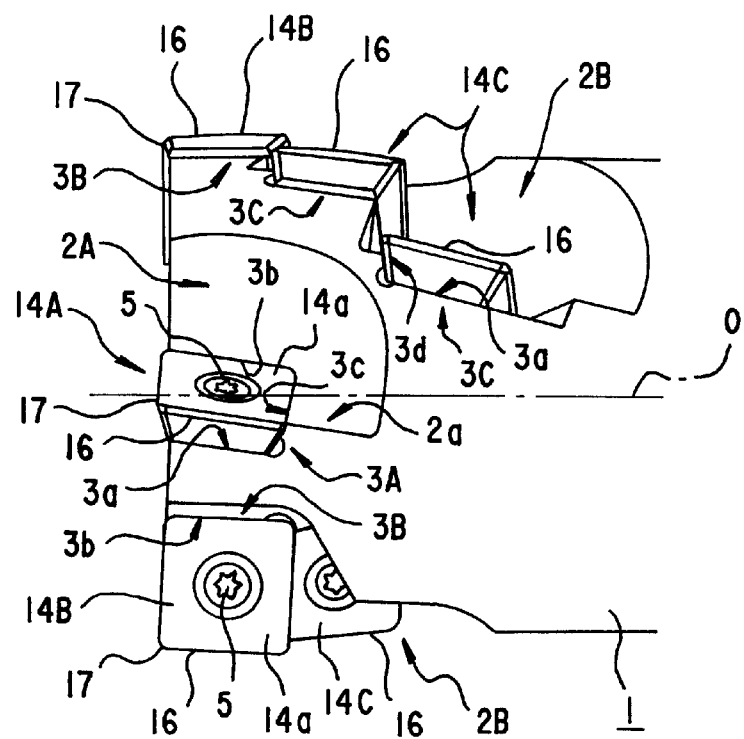
FIG. 9 is a side view illustrating still another embodiment of the present invention.
Figure 10:
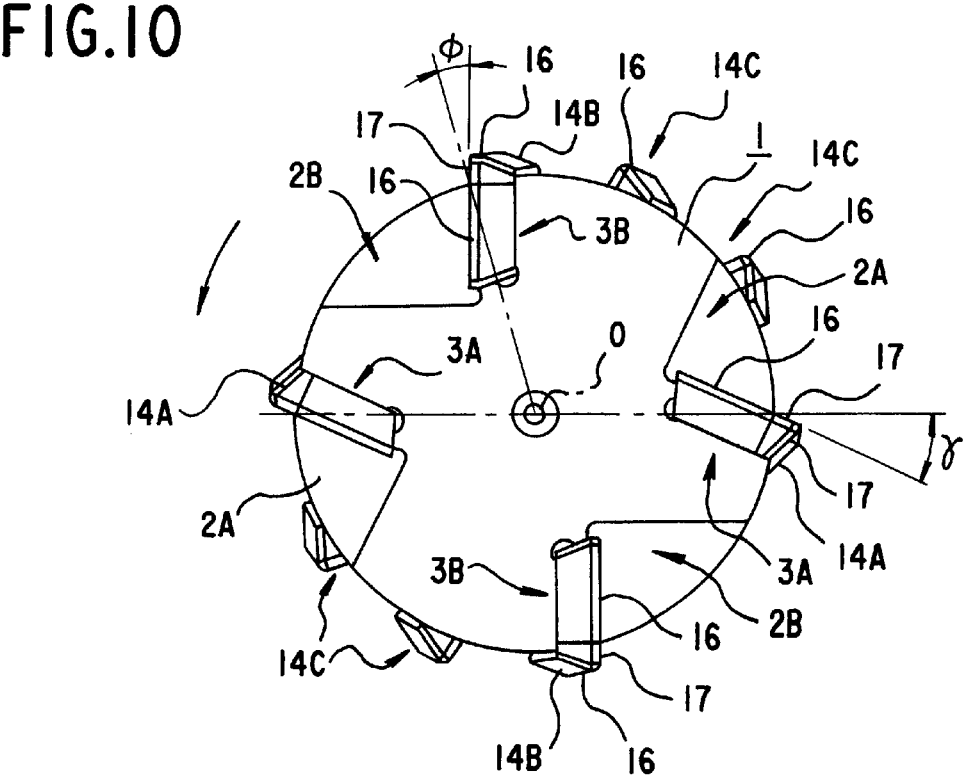
FIG. 10 is a front view of the embodiment shown in FIG. 9, as viewed from the forward end thereof.
Figure 11:
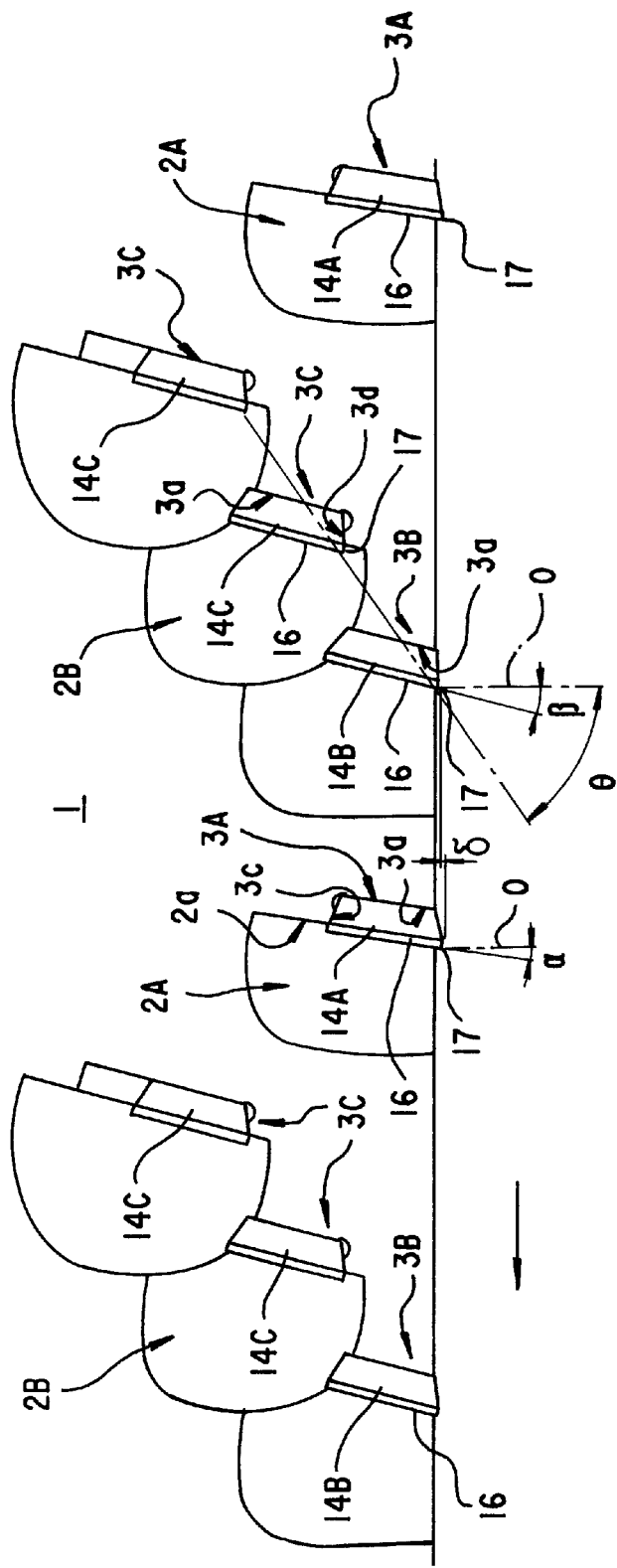
FIG. 11 is an exploded side view of the embodiment shown in FIG. 9.

In the foregoing two embodiments, all the tips 4A–4D are formed in the shape of a tabular parallelogram of the same shape and same dimensions. However, all the tips attached to the end mill body 1 may be formed, for example, in a generally tabular square shape, as indicated by 14 shown in FIGS. 9–11. The same elements of an embodiment shown in FIGS. 9–11 as those shown in FIGS. 1–4 are designated by like reference numerals.

The tip 14 is formed of a hard material, for example, cemented carbide, or the like, and of the type of a positive tip constructed as described below. Major cutting edges 16 are formed on the respective four side ridges of one surface 14a, serving as a rake surface, forming the generally square shape. At the same time, a minor cutting edge 17 is formed between the adjoining edges 16, 16. Lateral faces formed between the rake surface 14a and the other face forming the square shape each has an angle of relief.

The tips 14 constructed, as described above, are detachably fixed to the mounting seats, respectively, by means of clamp screws 5. More specifically, the first and second tips 14A and 14B are respectively mounted on the first and second tip mounting seats 3A and 3B provided at the forward end of the end mill body 1. The third tips 14C are mounted on the third mounting seats 3C spirally formed in the shape of steps adjacent to the base end of the second tip mounting seat 3B. In this embodiment, two pairs of tips, each pair having first and second tips 14A and 14B, are disposed at the forward end of the end mill body 1, while a third set of tips 14C is arranged adjacent to the base end of the second tip 14B.

Further, the first and second tips 14A and 14B positioned at the forward end of the end mill body 1 are located in the following manner. The edges 16, 16 of the first and second tips 14A and 14B positioned adjacent to the outer periphery of the end mill have positive axial rake angles α and β, respectively. On the other hand, the minor edges 17, 17 of the first and second tips 14A and 14B extending from the edges 16, 16 positioned adjacent to the forward end of the end mill have negative radial rake angles γ and Φ, respectively. Also, the edges 16, 16 of the respective tips 14A and 14B positioned on the outer periphery of the end mill are located in such a manner that the distance from the forward end of the edges 16, 16 to the axis O is equal to the distance from the rear end thereof to the axis O.

The reusable end mill is constructed in a manner similar to the previous embodiments. That is, the first, second and third tips 14A, 14B and 14C are formed in the same shape and dimensions. The rotation loci of the edges 16, 16 of the first and second tips 14A and 14B around the axis O are overlapped with each other, and the edge 16 of the first tip 14A protrudes slightly farther toward the forward end of the end mill than the edge 16 of the second tip 14B. With this arrangement, advantages similar to those obtained by the previous two embodiments can be realized.

Additionally, since four major edges 16 and associated minor edges 17 can be formed on one tip 14 in this embodiment, this tip can be utilized more efficiently twice as much as the above-described tips 4 formed in the shape of the tabular parallelogram. This can further prolong the life of the tips so as to improve the cost efficiency.

In addition to the above-described construction, the following arrangement is made to this embodiment. The major edge 16 of the first tip 14A positioned toward the outer periphery of the end mill has a positive axial rake angle α, while the minor edge 17 positioned toward the forward end of the end mill has a negative radial rake angle 7. The distance from the forward end of the edge 16 to the axis O is equal to the distance from the rear end thereof to the axis O. Because of this arrangement, it is possible to provide an angle of relief for the edge 16 positioned on the inner periphery of the minor edge 17, serving as the end cutting edge, during a cutting operation, which prevents the edge 16 located on the inner periphery of the forward end of the end mill from interfering with the work bottom surface during a cutting operation. Accordingly, this embodiment is advantageous because it can protect against a possible deterioration in the precision of the machined bottom surface caused by the interference of the edge 16 and also it can avoid waste and make the best use of the four major edges 16 formed on the tip 14.

The same advantages also apply to the second tip 14B whose minor edge 17 positioned toward the forward end of the end mill is provided with a negative radial rake angle Φ. Even if the protrusion amount δ of the edge 16 of the first tip 14A is small, the edge 16 of the second tip 14B located on the inner periphery of the forward end of the end mill can be effectively prevented from interfering with the work bottom surface.

Although in this embodiment only the first, second and third tips 14A, 14B and 14C are provided for the end mill body 1, fourth tips of the same shape and dimensions as the aforementioned tips 14 may certainly be disposed in addition to the above-described tips 14, as in the embodiment shown in FIGS. 5–8.

As is clearly seen from the foregoing description, the present invention offers the following advantages.

Only one type of tip of the same shape and dimensions is used. This remarkably simplifies the maintenance of tips provided for the end mill, which further reduces the labor required for the maintenance, thereby improving the working efficiency. Also, the rotation locus of the edges of the second tip around the axis is overlapped by the locus of the edges of the first tip including the end cutting edge. With this arrangement, the wear of the first tip can be inhibited so that the life of the tips can be prolonged. This accomplishes the uniformity of the degree of the wear of the overall tips attached to the end mill body, thereby further enhancing easier maintenance of tips.

REFERENCE NUMERALS

| | |
|---|---|
| 1 | end mill body |
| 2A, 2B | chip pockets |
| 3A, 3B, 3C, 3D | tip mounting seats |
| 3a | bottom surface of the tip mounting seat 3 |
| 3b, 3c, 3d | wall surfaces of the tip mounting seat 3 |
| 4A, 14A | first tips |
| 4B, 14B | second tips |
| 4C, 14C | third tips |
| 4D | fourth tip |
| 6, 16 | major cutting edges |
| 7, 17 | minor cutting edges |
| O | rotation axis of the end mill body 1 |
| α | axial rake angle of the major edges 6, 16 of the first tips 4A and 14A |
| β | axial rake angle of the major edges 6, 16 of the second tips 4B and 14B |
| δ | protrusion amount of the major edges 6, 16 of the first tips 4A and 14A |

What is claimed is:

1. A reusable type end mill comprising a generally cylindrical end mill body having a plurality of tip mounting seats formed on an outer periphery of said end mill body, and a plurality of interchangeable quadrilateral tabular tips, all of which are of substantially the same shape and dimensions and detachably mounted in respective of said mounting seats, said mounting seats being so disposed and said tips being mounted in said seats in a manner that a surface of said tip forming a quadrilateral shape serves as a rake surface and is directed in a rotating direction of said end mill, wherein said interchangeable tips include at least a pair of tips disposed at a forward end of said end mill body including a first tip and a second tip, and at least one third interchangeable tip disposed adjacent to a base end of said second tip, said first and second tips being displaced from each other in a peripheral direction of said end mill body, wherein a cutting edge of each of said tips has a positive axial rake angle and rotation loci of the edges of said first and second tips around the axis of said end mill body are overlapped by each other, and a disposition of said mounting seats which receive said first tip and said second tip being such that the axial rake angle of the cutting edge of said first tip is set less than the axial rake angle of the cutting edge of said second tip so as to protrude said cutting edge of said first tip toward said forward end of said end mill further than said cutting edge of said second tip, with said third tip being arranged in such a manner that a rotation locus of a cutting edge of said third tip and a rotation locus of a rear end of the cutting edge of said second tip overlap so that said second and third tips are arranged to extend spirally toward a rear of said end mill.

2. A reusable type end mill according to claim 1, wherein a protrusion amount of the edge of said first tip in relation to the edge of said second tip is set to be in a range of from 0.1 to 3.0 mm.

3. A reusable type end mill according to claim 1, wherein the axial rake angle of the edge of said first tip is set to be in a range of from 5° to 15°, and the axial rake angle of the edge of said second tip is set to be in a range of from 10° to 30°.

4. A reusable type end mill according to any one of claims 1 or 2, wherein at least one fourth replaceable type tip is disposed on the outer periphery of said end mill body, said fourth replaceable tip being displaced from said first, second and third tips in the peripheral direction of said end mill, whereby the rotation locus of the edge of said fourth tip around the rotation axis of said end mill body is overlapped by the locus of the edge of said third tip, and whereby no gap is formed between the rotation locus of the edge of said fourth tip and the rotation locus of the rear end of the edge of said first tip.

5. A reusable type end mill according to claim 1, wherein at least one fourth replaceable type tip is disposed on the outer periphery of said end mill body, said fourth replaceable tip being displaced from said first, second and third tips in the peripheral direction of said end mill, whereby the rotation locus of the edge of said fourth tip around the rotation axis of said end mill body is overlapped by the locus of the edge of said third tip, and whereby no gap is formed between the rotation locus of the edge of said fourth tip and the rotation locus of the rear end of the edge of said first tip.

6. A reusable type end mill according to claim 3, wherein at least one fourth replaceable type tip is disposed on the outer periphery of said end mill body, said fourth replaceable tip being displaced from said first, second and third tips in the peripheral direction of said end mill, whereby the rotation locus of the edge of said fourth tip around the rotation axis of said end mill body is overlapped by the locus of the edge of said third tip, and whereby no gap is formed between the rotation locus of the edge of said fourth tip and the rotation locus of the rear end of the edge of said first tip.

7. A reusable type end mill according to claim 1 wherein said first tip exists alone as a solitary tip disposed at the forward end of said end mill body peripherally displaced from said second tip and a space between a base end of said first tip and said rear end of said end mill is free of tips.

* * * * *